United States Patent [19]

Toye

[11] Patent Number: 5,103,955
[45] Date of Patent: Apr. 14, 1992

[54] CONVEYOR SYSTEM HAVING LOAD SUPPORTING MEMBER CARRIED BY MOUNTING MEANS IN SOCKETS OF BASE MEMBER

[75] Inventor: Edward W. Toye, Near Kidderminster, United Kingdom

[73] Assignee: Conveyer Units Limited, Worcestershire, United Kingdom

[21] Appl. No.: 500,638

[22] Filed: Mar. 28, 1990

[30] Foreign Application Priority Data

Mar. 28, 1989 [GB] United Kingdom ............... 8906930

[51] Int. Cl.$^5$ .................................... B65G 11/16
[52] U.S. Cl. .................................... 193/35 R; 193/37
[58] Field of Search ............... 193/35 R, 37, 355; 198/787, 836.2

[56] References Cited

U.S. PATENT DOCUMENTS

| 100,710 | 3/1870 | Bachelder | 198/787 X |
| 3,151,551 | 10/1964 | Dutro et al. | 193/37 |
| 3,174,613 | 3/1965 | Insolio | 198/787 X |
| 3,509,973 | 5/1970 | Bedford | 193/35 R |
| 3,586,142 | 6/1971 | Inwood et al. | 193/37 X |
| 3,610,387 | 10/1971 | Vom Stein | 193/35 X |
| 3,713,521 | 1/1973 | Moritake | 193/37 |
| 3,721,326 | 3/1973 | Bussienne | 193/37 X |
| 4,664,243 | 5/1987 | Martin | 193/37 |
| 4,890,714 | 1/1990 | Brown | 193/35 R |

FOREIGN PATENT DOCUMENTS

| 0228805 | 11/1986 | European Pat. Off. |
| 1222430 | 8/1966 | Fed. Rep. of Germany .... 193/35 R |
| 2152632A | 8/1985 | United Kingdom . |

Primary Examiner—Robert P. Olszewski
Assistant Examiner—Cheryl L. Gastineau
Attorney, Agent, or Firm—Skjerven, Morrill, MacPherson, Franklin & Friel

[57] ABSTRACT

A conveyor system includes a base member affording a bottom member of a track having an entry end and an exit end, between which articles are required to be conveyed. The base member is provided with a plurality of sockets at respective mutually spaced locations distributed longitudinally and transversely of the track, each socket having a load supporting member mounted therein so as to be independently rotatable about an axis of location extending transversely to the track. A mounting rotatably carries the load supporting member and cooperates with the socket, each such mounting comprising a pair of separate mounting parts. The mounting parts are engaged with opposite end portions of the load supporting member so as to carry the load supporting member between the mounting parts for rotation about the axis. The mounting parts have associated with them a resilient member whereby an assembly comprising a load supporting member and a pair of mounting parts is snap-fitted into a socket so as to retain the load supporting member in the socket.

15 Claims, 4 Drawing Sheets

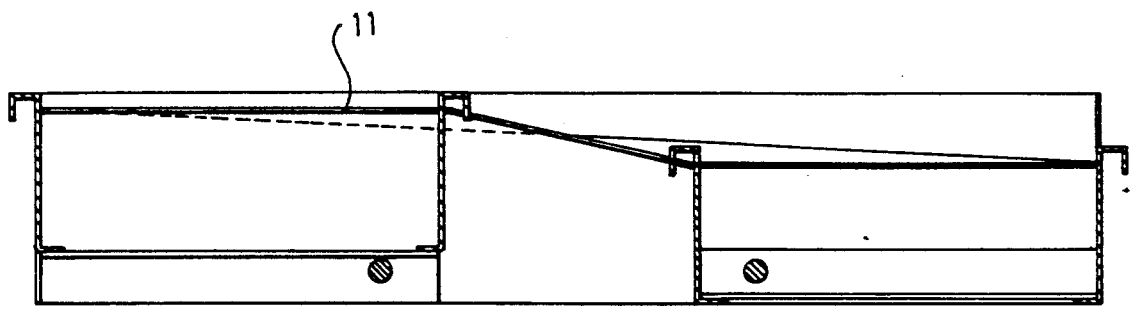
FIG 2a
FIG 3
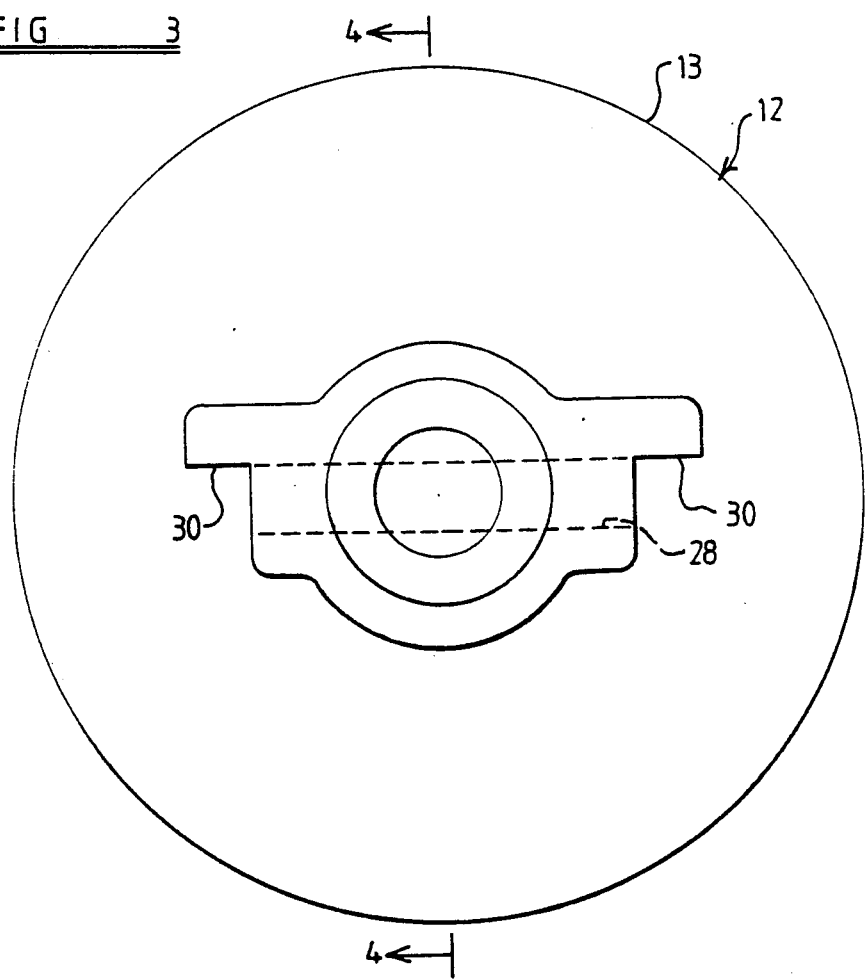

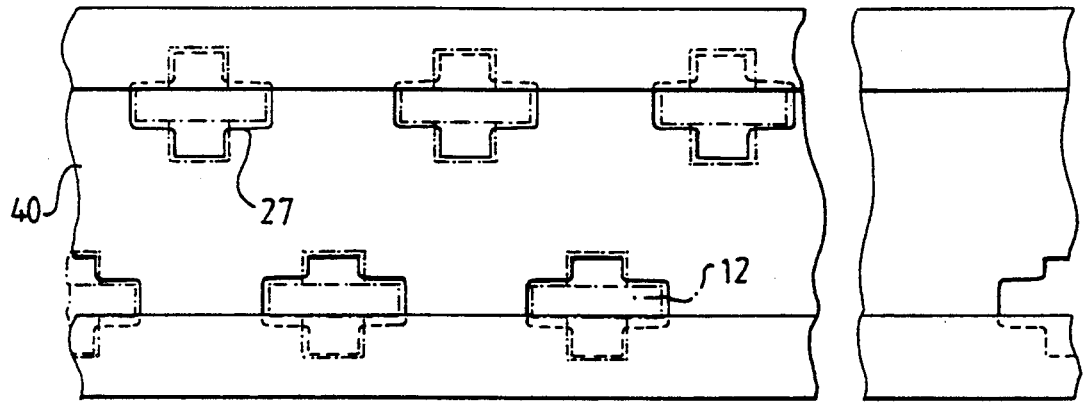
FIG 7
FIG 6
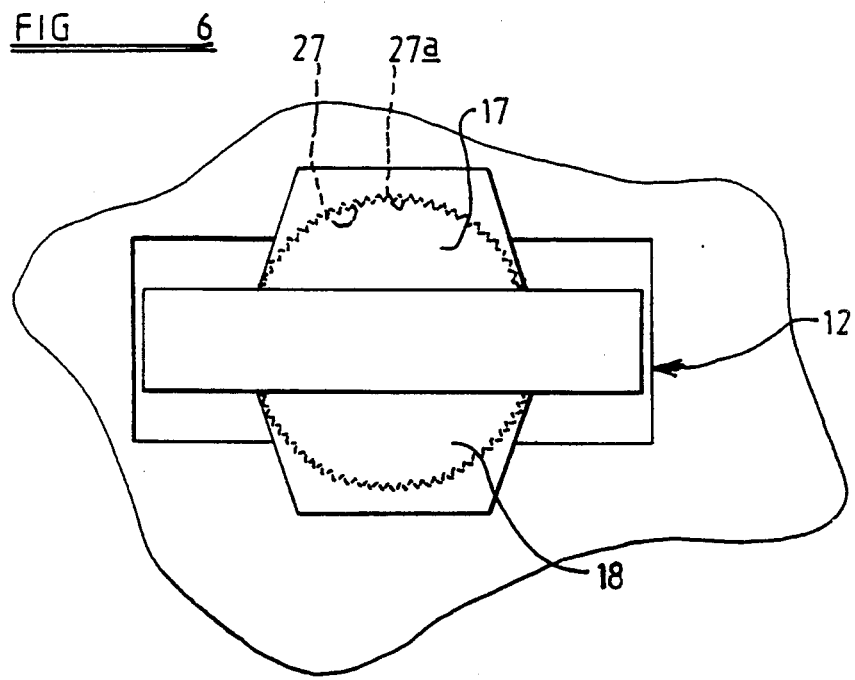

CONVEYOR SYSTEM HAVING LOAD SUPPORTING MEMBER CARRIED BY MOUNTING MEANS IN SOCKETS OF BASE MEMBER

BACKGROUND OF THE INVENTION

This invention relates to a conveyor system having a conveying surface by which a load supported thereon may be conveyed. More particularly, but not exclusively, the invention relates to a corner unit, for such a conveyor system, of the kind, hereinafter referred to as being of the kind specified, comprising a plurality of load supporting members which are rotatable about axes which are inclined to each other so as to cause a load to be conveyed along a curved path around a corner.

Hitherto the load supporting members have comprised elongate rollers which extend transversely to the path and which are rotatable about axes which radiate from a centre of curvature of the path.

An object of the invention is to provide a new and improved conveyor system and a further object is to provide a new and improved corner unit of the kind specified.

SUMMARY OF THE INVENTION

According to a first aspect of the present invention we provide a conveyor system comprising a plurality of rotatable load supporting members wherein each load supporting member is carried on a mounting member, the mounting member being received in a socket of a base member.

The base member may comprise a bottom member of a conveyor system, and the load supporting member may provide a load supporting and conveying means, or a side member of a conveyor system, and the load supporting member may comprise a lateral guide for a load.

The conveyor system may comprise a corner unit wherein a plurality of load supporting members are rotatable about axes which are inclined to each other so as to cause a load to be conveyed along a curved path around a corner.

Some of the supporting members may be rotatable about axes which are normal to radii from a first centre of curvature whilst other of the supporting members may be rotatable about axes which are normal to radii from at least one further centre of curvature.

Each mounting member may comprise a plastics moulding.

Each mounting member may comprise two parts and the load supporting member being mounted therebetween on a spindle means.

Each of said two parts may have a stub spindle which is received in a recess of the load supporting member to mount the load supporting member for rotation between the parts of the mounting member.

The load supporting member may be provided with a bearing, an inner member of the bearing being provided with the recess.

The bearing may be a rolling element bearing such as a ball or roller bearing, in which case the inner member comprises the inner race thereof.

Resilient biasing means may be provided to bias the parts of the mounting member away from each other and into engagement with the socket.

Each socket may comprise an opening provided in the base member.

Each mounting member and socket may be provided with co-operating detent means to retain each mounting member in an associated socket.

Each mounting member may have a groove in which an edge part of the associated aperture is received to provide said detent means.

The base member may comprise a plate having a plurality of said apertures formed therein, for example, by punching.

The plate may be flat or may be curved to provide, for example, a helical or part helical path.

Each socket may have a non-circular configuration and an associated mounting member having a co-operating configuration so as to permit the mounting members to be received in the socket so that the axis of rotation of the load supporting members is disposed in a unique direction.

Alternatively, each socket and associated mounting member may have inter-engaging parts which are circular so that the axis of rotation of the load supporting member may be positioned in any desired angular position and means being provided to lock an associated mounting member in a desired angular relationship.

Said means may comprise a fastener extending between each mounting member and the base member.

Further alternatively, the inter-engageable parts of each mounting member and associated socket may be arranged so as to permit the axis of rotation of the load supporting member to be disposed in any one of a predetermined number of angular positions.

Each load supporting member may comprise a wheel and the wheel may have a load engageable surface which is of a width which is not greater than its diameter.

According to another aspect of the present invention we provide a corner unit of the kind specified wherein each load supporting member comprises a wheel having a load engageable surface which is of a width which is not greater than its diameter.

In all aspects of the invention the load engageable surface may be cylindrical.

BRIEF DESCRIPTION OF THE DRAWINGS

An embodiment of the invention will now be described by way of example with reference to the accompanying drawings wherein:

FIG. 2a is a section on the line 2a—2a of FIG. 2;

FIG. 3 is a side elevation of a mounting member and wheel of the corner unit of FIG. 2.

FIG. 6 is a fragmentary plan view of another modification of the corner unit shown in FIG. 2;

FIG. 7 is a diagrammatic fragmentary side elevation of a lateral guide part of the system of FIG. 1 with supporting members omitted for clarity.

DESCRIPTION OF THE PREFERRED EMBODIMENTS

Figure 1:
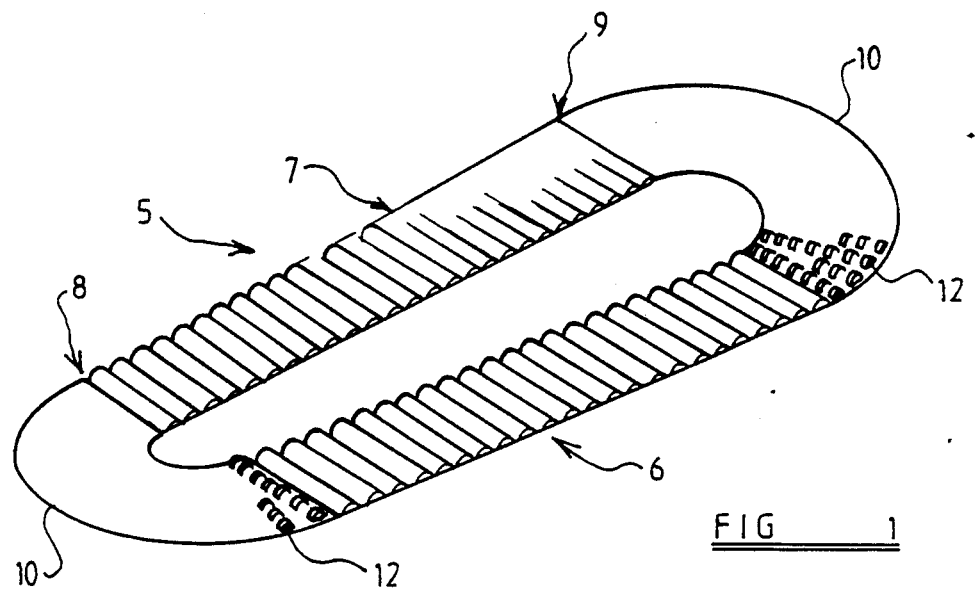
FIG. 1 is a diagrammatic perspective view of a conveyor system embodying the invention.

Referring to the drawings, a conveyor system 5 comprises two driven roller rectilinear main conveying runs 6, 7 inter-connected at their ends by corner units 10. The main conveying run 6 is horizontal whilst the other main run 7 is inclined upwardly from one end 8 towards the opposite end 9. The corner units 10 each provide a helical downward supporting and conveying means along which articles travel under gravity. Each corner unit 10 comprises a base member in the form of a thin steel plate 11 of helical configuration and semi-circular shape in plan view. A plurality of load supporting members 12 are provided, distributed over the plate 1 to give a desired distribution.

Each load supporting member 12 comprises a wheel which, as best shown in FIG. 3, has a cylindrical load supporting surface 13 which is rotatable, through a ball race, not shown, relative to an inner race or sleeve member 14 having a recess 15 of cylindrical configuration.

In FIG. 1, 15 rows of load supporting members are provided, row 1 being of smallest circumference and row being of greatest circumference. The pitch between the axes of rotation of adjacent members 12 in a given row is as set out in the Table, and the axes of rotation are generally parallel to a radius to the centre of curvature of the semi-circle. If, in a particular application, a somewhat different axis orientation is found empirically to maintain a load in a predetermined orientation to a line of conveying, then an appropriate axis orientation may be provided. In the illustrated example the axes of rotation in the areas marked A-C are parallel to radii from a respective centre of curvature marked A-C. If desired other orientations may be provided.

TABLE

| Row No. | Pitch (mm) between wheels | No. of wheels |
| --- | --- | --- |
| 1 | 68.54 | 8 |
| 2 | 63.68 | 11 |
| 3 | 66.16 | 13 |
| 4 | 63.4 | 16 |
| 5 | 65.18 | 18 |
| 6 | 63.26 | 21 |
| 7 | 64.65 | 23 |
| 8 | 65.81 | 25 |
| 9 | 64.32 | 28 |
| 10 | 65.29 | 30 |
| 11 | 66.15 | 32 |
| 12 | 66.90 | 34 |
| 13 | 65.69 | 37 |
| 14 | 64.66 | 40 |
| 15 | 65.34 | 42 |

Each wheel 12 is carried on a mounting member 16 comprising two similar parts 17, 18 each made as a separate moulding in suitable synthetic plastics material.

Each part 17, 18 comprises a stub spindle portion 20 which is received within the recess 15 and a support portion 21 which is in mounting engagement with a socket 22 formed as a punched aperture 23 in the plate 11.

Each part 17, 18 is provided with a cylindrical recess 24 which receives outwardly projecting parts 25 of the inner race 14 and are of a depth so that an end surface 26 of the extending parts 25 abuts an end surface 27 of the recess 24.

Figure 2:
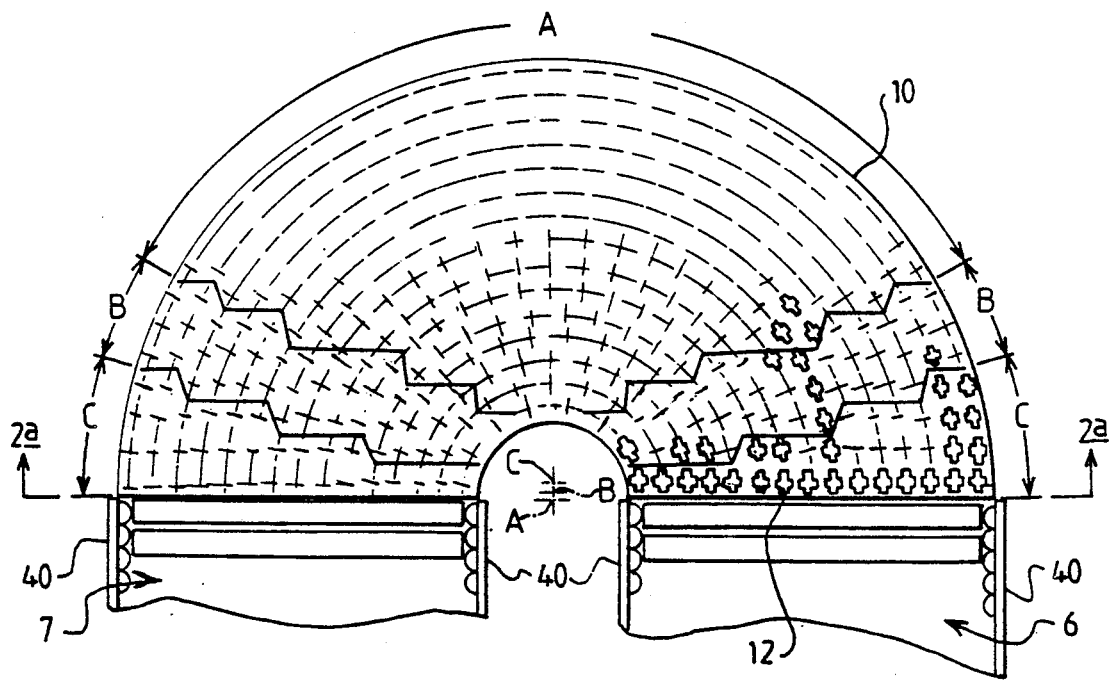
FIG. 2 is a diagrammatic plan view of a corner unit of the conveyor system of FIG. 1 with supporting members omitted for clarity.
Figure 4:
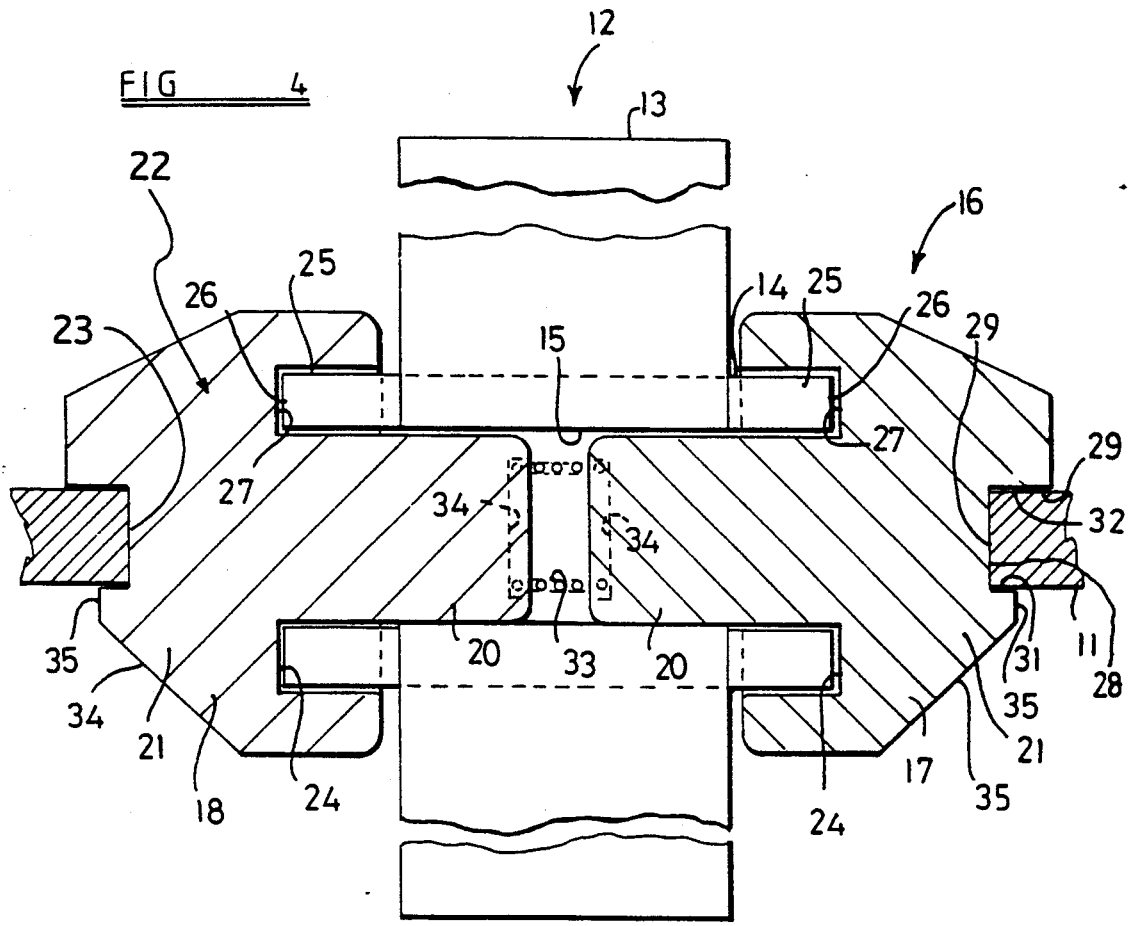
FIG. 4 is a section on the line 4—4 of FIG. 3.

The support part 21 is generally rectangular in front elevation, as best shown in FIG. 2, and has a longitudinally extending groove 28 formed therein in which is received a peripheral part 29 of the aperture 23 formed in the plate 11. Projecting outwardly from the upper edge of the generally rectangular part 21 are flanges 30 which overlie the plate around the periphery of the aperture therein.

As best shown in FIG. 3, the supporting part 21 is formed so that the bottom wall 31 of the groove 28 is shorter than the top wall 32 thereof.

In use, the two parts 17, 18 of the mounting member 16 are engaged with a wheel 12 as shown in FIG. 3 and, if desired, a coil compression spring 33 may be provided between the stub spindle portions 20 and preferably received in a counter-bore 34 provided therein.

The assembly is then introduced downwardly into the aperture 23, the parts 17, 18 being pressed together to permit of introduction and this being facilitated by inclined parts 35 on the underside of the part 21 which serve to cam the parts 17, 18 together on applying a downward pressure to the assembly as a result of engagement of the surfaces 35 with the peripheral part 32 of the aperture 23.

Where no spring 33 is provided the parts 17, 18 may be dimensioned so that the inherent resilience of the material of which the parts are made enables the peripheral part 29 of the aperture in the plate 11 to snap into the groove 28. Alternatively, where a spring 33 is provided the parts 17, 18 may be dimensioned so as to permit clearance passage of the lower part 36 into the aperture 23, following which the spring 33 resiliently biases the parts 17, 18 apart on release of manual pressure holding the parts 17 and 18 together.

Consequently, each wheel 12 may be easily and conveniently mounted in each aperture.

Since each wheel 12 is independently supported on its associated mounting member any desired distribution of wheels may be provided over the plate 11, the only constraint being that the availability of sufficient space on the plate 11 between adjacent apertures.

The apertures 23 are of generally rectangular shape in plan view and are orientated so that, in use, the axis of rotation of each wheel 12 engaged therein describes a radius from a desired centre of curvature of the path. It will be appreciated that any desired orientation of apertures may be provided and any desired path configuration may be provided so that the corner section can cause articles to be conveyed along a curved path of any desired shape, not only the 180 path shown in FIG. 1 but through any other desired angle or combination of angles, for example, along an S-shaped path.

If desired, the plate 11 may be other than helical, for example, it may be of planar configuration so that the path along which articles are caused to be conveyed is curved in a single plane, for example, a horizontal plane, or it may be of any other desired shape.

Figure 5:
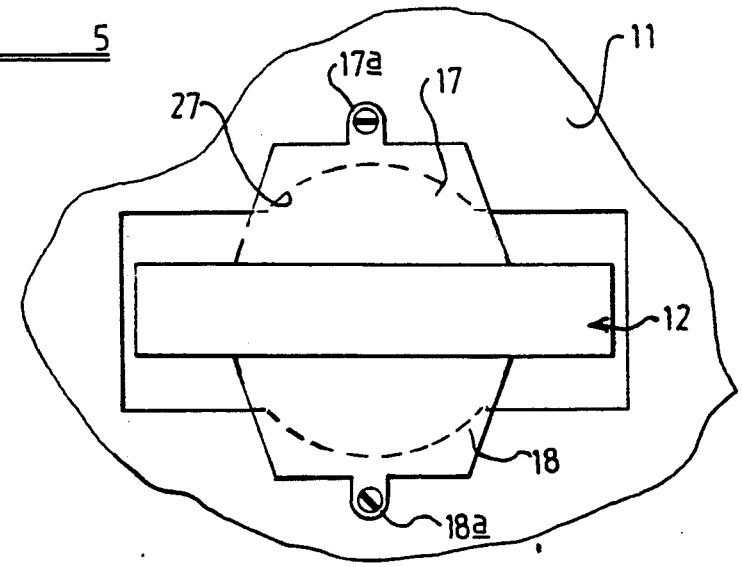
FIG. 5 is a fragmentary plan view of a modification of the corner unit shown in FIG. 2.

In a modification, shown in FIG. 5, the apertures 27 are circular and the parts 17, 18 have an aperture engaging portion of corresponding part circular configuration so that the assembly of parts 17, 18 and wheel 12 may be orientated in each circular aperture as desired and suitable means may be provided to lock the assembly in a selected orientation. Such means may comprise, for example, a projecting nose 17a, 18a provided on one or each of the parts 17, 18 adapted to receive a fastener 17b, 18b which is driven into the plate 11. For example, a hole may be drilled in the plate 11 when the assembly is positioned as desired and a self tapping screw passed through the nose and driven into the aperture.

In a further modification, shown in FIG. 6, the apertures are provided with a non-circular configuration and the parts 17, 18 with an aperture engaging part of corresponding configuration to enable the assembly of parts 17, 18 and wheel 12 to be engaged in the aperture at any one of a predetermined number of angular positions. For example, and as illustrated, the aperture 27 may be generally circular and provided with a plurality of serrations or teeth 27a with which corresponding serrations or teeth provided on the parts 17, 18 may be engaged in any desired one of a plurality of angular positions related to the number of teeth.

A conveyor corner unit embodying the present invention provides a relatively economical means of moving a load through a curve with minimum disturbance of package or orientation in the direction of travel. The mounting of individual wheels by mounting members received in a socket on a base member provides a great flexibility of distribution of load supporting members and also there is a great flexibility of orientation of the axis of rotation of the load supporting member. In addition, engagement or removal of individual load supporting members is simply and easily achieved so that, for example, replacement or a change in the number of load supporting members can be easily effected.

Whilst the invention was developed for use in a corner unit it may be used in any desired application in a conveyor system and may, for example, be used as a main load supporting and conveying means of a rectilinear gravity feed conveyor run, which may be provided with load supporting members as described in connection with the corner units 10, and/or on side members of the conveyor which provide lateral guide elements (which provide a base member for such load supporting members) in which, latter, case the load supporting members would rotate about vertical or generally vertical axes as shown in FIG. 7.

The features disclosed in the foregoing description, or the following claims, or the accompanying drawings, expressed in their specific forms or in terms of a means for performing the disclosed function, or a method for attaining the disclosed result, may, separately or any combination of such features, be utilised for realising the invention in diverse forms thereof.

I claim:

1. A conveyor system comprising a base member affording a bottom member of a track having an entry end and an exit end, between which articles are required to be conveyed, in use, the base member being provided with a plurality of sockets at respective mutually spaced locations distributed longitudinally and transversely of the track, each socket comprising an opening in the base member and each said socket having a respective load supporting member mounted therein so as to be independently rotatable about a respective axis of rotation extending transversely to the track through the intermediary of mounting means rotatably carrying the load supporting member and cooperating with the socket, each mounting means and socket being provided with cooperating detent means to retain each mounting means in an associated socket, each mounting means comprising a pair of separate mounting parts engaged, by application to the load supporting member in a direction parallel to said respective axis of rotation, with opposite end portions of the load supporting member so as to carry the load supporting member between said mounting parts for rotation about said axis, and the mounting parts having associated therewith resilient means whereby an assembly comprising a load supporting member and a pair of mounting parts are snap-fitted into a socket, by cooperation between the mounting parts and respective edges of the socket, to retain the load supporting member in the socket and disposed between the mounting parts in captive and rotatable manner.

2. A conveyor system according to claim 1 wherein the conveyor system comprises a corner unit wherein the load supporting members are rotatable about axes which are inclined to each other so as to cause a load to be conveyed along a curved path around a corner.

3. A conveyor system according to claim 2 wherein some of the supporting members are rotatable about axes which are parallel to radii from a first centre of curvature whilst other of the supporting members are rotatable about axes which are parallel to radii from at least one other centre of curvature.

4. A conveyor system according to claim 1 wherein each mounting means comprises a plastics moulding.

5. A conveyor system according to claim 1 wherein the load supporting member is mounted between said two parts of a respective mounting means on a spindle means.

6. A conveyor system according to claim 5 wherein each of said two parts has a stub spindle, which together provide said spindle means, which is received in a recess of the load supporting member to mount the load supporting member for rotation between the parts of the mounting means.

7. A conveyor system according to claim 6 wherein the load supporting member is provided with a bearing, an inner member of the bearing being provided with said recess in which said stub spindles are received.

8. A conveyor system according to claim 7 wherein the bearing is a rolling element bearing and the inner member comprises the inner race thereof.

9. A conveyor system according to claim 5 wherein said resilient means bias the parts of the mounting member away from each other and inter-engage with the socket.

10. A conveyor system according to claim 1 wherein each mounting member has a groove in which an edge part of the associated opening is engaged to provide said detent means.

11. A conveyor system according to claim 1 wherein the base member provides a part helical track.

12. A conveyor system according to claim 1 wherein each socket has a non-circular configuration and an associated mounting means has a cooperating configuration so as to permit the mounting means to be received in the socket so that the respective axis of rotation of each load supporting member is disposed in a unique direction.

13. A conveyor system according to claim 1 wherein each socket and associated mounting means has interengaging parts which are circular so that the respective axis of rotation of each load supporting member may be positioned in any desired angular position and means are provided to lock an associated mounting member in a desired angular relationship.

14. A conveyor system according to claim 1 wherein each pair of mounting parts and respective edges of the socket are engaged so as to permit the respective axis of rotation of each load supporting member to be disposed in any one of a predetermined number of angular positions.

15. A conveyor system according to claim 1 wherein each load supporting member comprises a wheel and the wheel has a load engageable surface which is of a width which is not greater than its diameter.

* * * * *